United States Patent
Sinico et al.

(10) Patent No.: US 11,708,834 B2
(45) Date of Patent: Jul. 25, 2023

(54) DEVICE FOR DETECTING THE LEVEL OF A WELL/TANK AND ELECTRIC IMMERSION PUMP WITH THE DEVICE

(71) Applicant: DAB PUMPS S.P.A., Mestrino (IT)

(72) Inventors: Francesco Sinico, Montecchio Maggiore (IT); Sergio Sportoletti, Pisa (IT); Francesco Ciuchi, Pontedera (IT); Stefano Tazioli, Localita' Gabbro (IT)

(73) Assignee: DAB PUMPS S.P.A., Mestrino (IT)

( * ) Notice: Subject to any disclaimer, the term of this patent is extended or adjusted under 35 U.S.C. 154(b) by 292 days.

(21) Appl. No.: 16/933,033

(22) Filed: Jul. 20, 2020

(65) Prior Publication Data
US 2021/0025398 A1    Jan. 28, 2021

(30) Foreign Application Priority Data
Jul. 25, 2019    (IT) .................... 102019000012879

(51) Int. Cl.
*F04D 13/08*    (2006.01)
*F04D 15/00*    (2006.01)
*F04D 29/20*    (2006.01)
*G01F 23/18*    (2006.01)
*G08C 17/02*    (2006.01)

(52) U.S. Cl.
CPC ............. *F04D 13/08* (2013.01); *F04D 15/00* (2013.01); *F04D 29/20* (2013.01); *G01F 23/18* (2013.01); *G08C 17/02* (2013.01)

(58) Field of Classification Search
CPC .. F04D 13/08; F04D 13/086–10; F04D 15/00; F04D 15/0218; F04D 29/20; G01F 23/18; G08C 17/02
See application file for complete search history.

(56) References Cited

U.S. PATENT DOCUMENTS

| 7,458,782 B1* | 12/2008 | Spadola, Jr. ............ F04B 49/02 |
| | | 417/36 |
| 9,103,344 B2* | 8/2015 | Andresen ................ F04D 13/08 |
| 2006/0185840 A1* | 8/2006 | Conrad .................. E21B 47/06 |
| | | 166/250.07 |
| 2007/0258827 A1* | 11/2007 | Gierke .................. F04D 15/029 |
| | | 417/44.11 |
| 2011/0202189 A1* | 8/2011 | Venkatakrishnan ... G06Q 10/06 |
| | | 700/286 |

(Continued)

FOREIGN PATENT DOCUMENTS

| EP | 2743666 A1 | 6/2014 |
| EP | 2851883 A1 | 3/2015 |
| EP | 3489517 A1 | 5/2019 |

OTHER PUBLICATIONS

Italian Search Report dated Mar. 27, 2020 issued in IT 201900012879, with partial translation.

*Primary Examiner* — Alexander B Comley
(74) *Attorney, Agent, or Firm* — Scully, Scott, Murphy & Presser, P.C.

(57) ABSTRACT

An electric immersion pump having a containment shell containing a wet section, an electromechanical section, and an electronic section, having a compartment inside which an assembly for the control and actuation of the electric pump is contained, wherein the control and actuation assembly is connected to a user interface, a wireless Near Field Communication (NFC), and an electronic management and control element.

6 Claims, 3 Drawing Sheets

(56) References Cited

U.S. PATENT DOCUMENTS

| | | | | |
|---|---|---|---|---|
| 2013/0133881 A1* | 5/2013 | Boyles | ............. | F04D 13/08 |
| | | | | 166/250.01 |
| 2013/0243614 A1* | 9/2013 | Moon | ............. | E03F 1/007 |
| | | | | 417/63 |
| 2013/0272898 A1* | 10/2013 | Toh | ............. | F04D 13/10 |
| | | | | 417/44.1 |
| 2018/0112658 A1* | 4/2018 | Fosmark | ............. | F04B 51/00 |

* cited by examiner

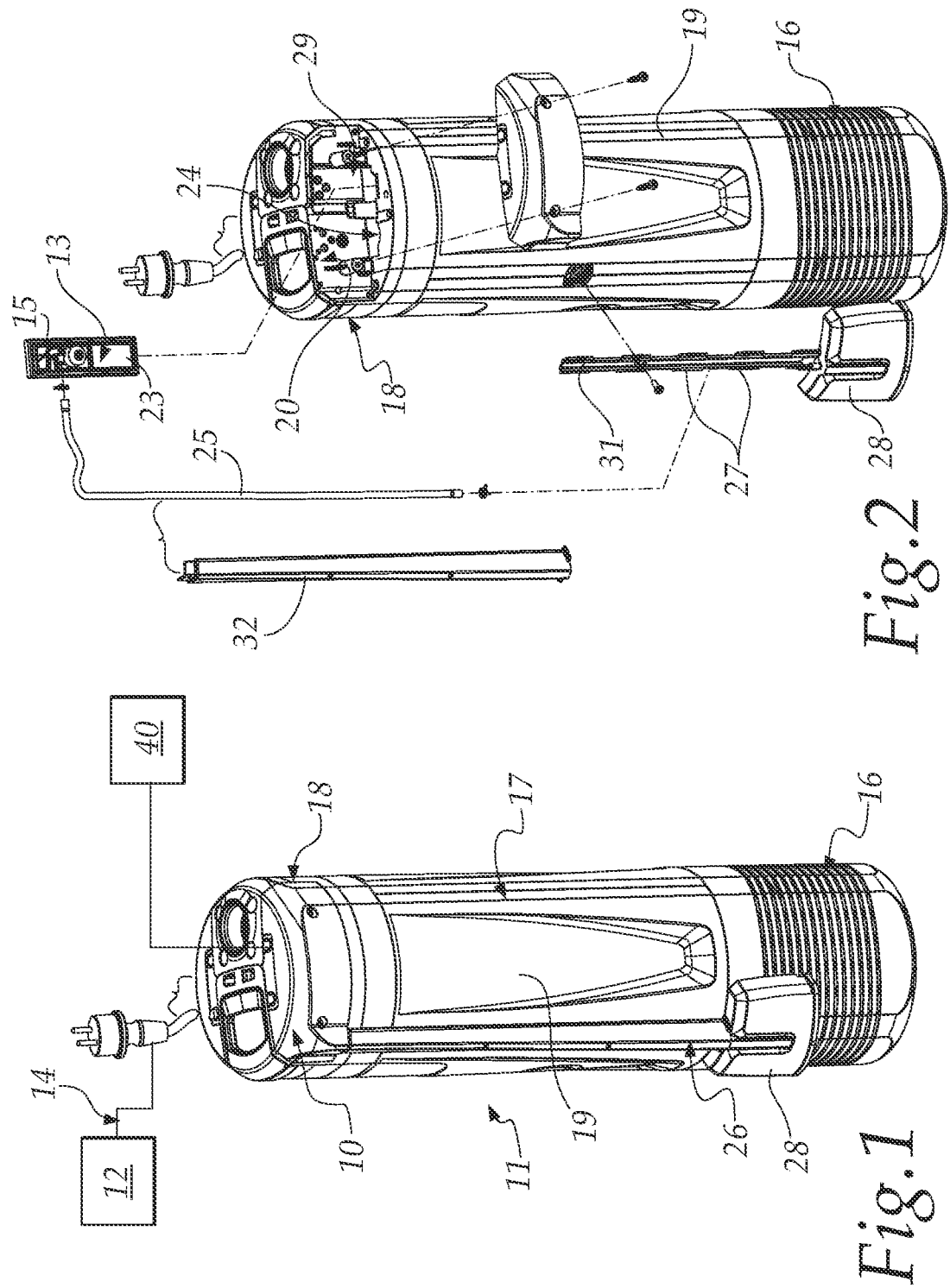

DEVICE FOR DETECTING THE LEVEL OF A WELL/TANK AND ELECTRIC IMMERSION PUMP WITH THE DEVICE

The present invention relates to a device for detecting the level of a well/tank.

The invention is applied in particular for the detection of the level of a well/tank in which an electric immersion pump is used.

The present invention also relates to an electric pump provided with such a device.

Electric immersion pumps are electric pumps that are used inside wells and/or tanks to draw the liquid (normally water) contained therein.

One of the most strongly felt requirements on the part of the user is to know the level of the liquid in the well/tank and therefore its residual availability.

Currently, in order to have an idea of the level of the well/tank, the user must for example insert his head in order to have direct visual contact with the free surface of the contained liquid.

In the present description, the expression "free surface" is understood to refer to the separation surface between the liquid phase (liquid contained in the well/tank) and the gaseous phase (air).

Often, however, wells/tanks in which said immersion pumps are used are not easily or quickly accessible to the user.

For this reason, level probes, including immersion probes, are widely used.

These immersion probes are immersed in the well/tank, usually to the bottom, and measure the filling level or height of the well/tank according to the principle by which a liquid generates, with its relative density and the force of gravity, a weight force that increases proportionally with the filling level.

These probes comprise a measurement end, which contains for example a silicon strain gauge and the electronic devices for evaluating the variations of the former, from which one or more metallic cables with capillaries extend in order to compensate for atmospheric pressure.

The measurement of the level is provided by determining the difference between the ambient pressure, measured by a sensor outside the tank, and the pressure measured by the probe.

As an alternative, level probes of the float type are used, for example.

These float probes comprise, inside the float, a magnet which moves as a function of the movement of the level of the well/tank and interacts with one or more electrical contacts of the reed type, modifying their electrical condition.

However, all these known methods have some drawbacks.

First of all, for their operation, these probes have at least one cable that must be connected to a dedicated user interface that is external to the well/tank.

This entails considerable space occupations and the need to provide an access to the tank also for this cable, in addition to the one dedicated to the passage of the power supply cable of the electric pump and to the one for the passage of the delivery duct.

Furthermore, the user is forced to use both an electric pump and a level probe and this entails for the user:

the drawback of having to first purchase two items of equipment (electric pump and probe) and then perform two distinct installations, with consequent increase in the time required to install the well/tank, the need to provide and use two electric power supply sources, one for the electric pump and the other for the probe, or to use one with two different outputs.

Moreover, a drawback is caused by the fact that the installation of the probe normally must be performed by expert personnel and cannot be performed easily by the user.

The aim of the present invention is to provide a device for detecting the level of a well/tank and an electric pump with such a device which are capable of improving the background art in one or more of the aspects indicated above.

Within this aim, an object of the invention is to provide a device for detecting the level of a well/tank that can be installed easily by the user and at any time.

Another object of the invention is to provide a device for detecting the level of a well/tank that is at least partially integrated in an electric pump used in said well/tank.

A further object of the invention is to provide a device for detecting the level of a well/tank that has a reduced space occupation.

Another object of the invention is to provide a device for detecting the level of a well/tank without the need to provide a dedicated access to the well/tank for its power supply and its operation but utilizes the same access to the well/tank that the electric pump used.

Another object of the invention is to provide an electric pump which comprises a device for detecting the level of a well/tank capable of achieving the aim and objects listed above.

Another object of the present invention is to overcome the drawbacks of the background art in a manner that is alternative to any existing solutions.

Another object of the invention is to provide a device for detecting the level of a well/tank and an electric pump with such a device that are highly reliable, relatively easy to provide and at competitive costs.

This aim, as well as these and other objects which will become better apparent hereinafter, are achieved by a device for detecting the level of a well/tank, characterized in that it comprises:

a management and control element, of the electronic type, a first portion, comprising an air pressure sensor, physically/electrically connected to said management and control element, a second portion, which comprises a pressure transducer and is connected to said management and control element by means of a wireless connection.

Further characteristics and advantages of the invention will become better apparent from the description of a preferred but not exclusive embodiment of the device for detecting the level of a well/tank and of the electric pump with such a device, according to the invention, illustrated by way of non-limiting example in the accompanying drawings, wherein:

FIG. 1 is a view of a device for detecting the level of a well/tank and of an electric pump to which the device is applied, according to the invention;

FIG. 2 is a partially exploded detail view of what is shown in FIG. 1;

Figure 3:
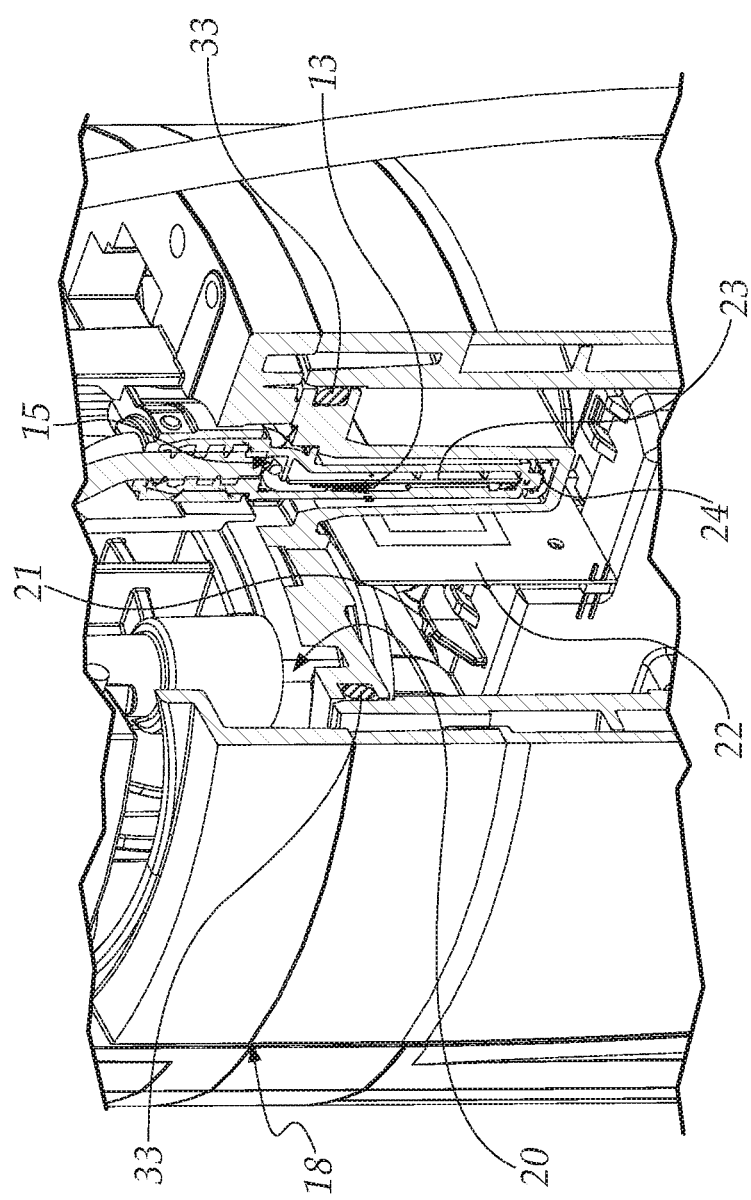
FIG. 3 is a sectional view of a detail of what is shown in FIG. 1.
Figure 4:
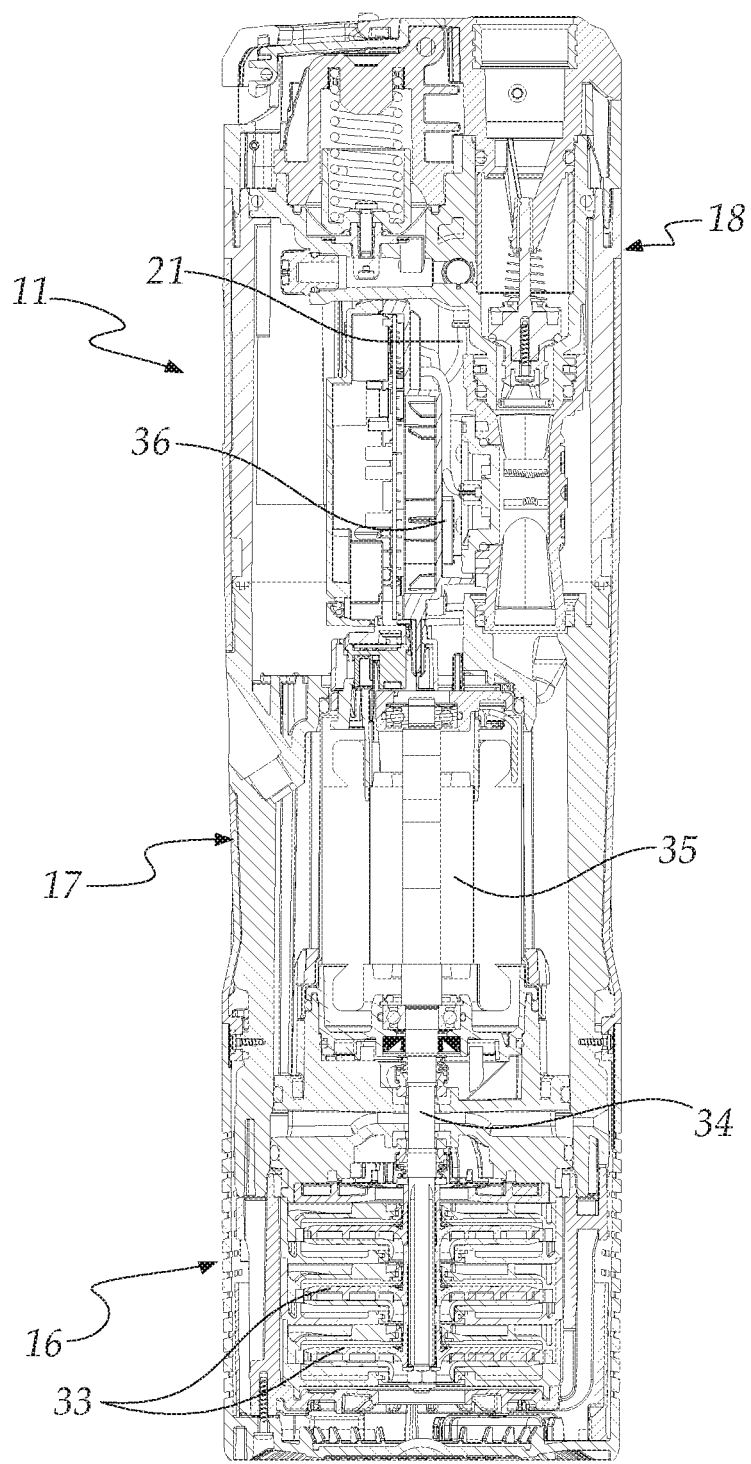
FIG. 4 is a sectional view of an electric pump according to the invention.

With reference to the figures, a device for detecting the level of a well/tank, according to the invention, is designated generally by the reference numeral 10.

The device 10 is applied to an electric pump 11 and is at least partially integrated therein.

The device 10 comprises:
- an element 40 for the management and control of the device 10, of the electronic type, which is connected and/or coincides with an interface which may coincide with the user interface of the electric pump 11 or be connected thereto,
- a first portion 12, which comprises an air pressure sensor, physically/electrically connected to the management and control element 40,
- a second portion 13, which comprises a pressure transducer 15, which is connected to the management and control element 40 via a connection of the wireless NFC (Near Field Communication) type.

The air pressure sensor is for example a sensor of the type known by the trade name "Infineon DPS310".

The pressure transducer is for example the transducer of the type known by the trade name "Honeywell MPRLS0025PA00001A".

The first portion 12 is external to the well/tank.

The air pressure sensor has a data link to the electric pump 11 by means of the electrical mains 14.

In particular, the air pressure sensor has a data link to the management and control element 40 via an electrical connection, utilizing so-called "power line" technology, also known as PLC ("Power Line Communication").

The electric pump 11 is of the immersion type, is extended vertically in the configuration for use and comprises a containment shell 19, inside which there are:
- a wet section 16, which comprises an intake portion and a delivery portion, both not shown in the figures, and one or more impellers 33 keyed on a shaft 34, each with its own diffuser, and interposed between the intake portion and the delivery portion,
- an electromechanical section 17, which comprises motor means 35 for the movement of the shaft 34,
- an electronic section 18, comprising a compartment 20 inside which an assembly 21 for the control and actuation of the electric pump 11 is contained, said assembly being provided with an electrical board 36.

The control and actuation assembly 21 is connected to the user interface and comprises communication means 22 of the NFC type.

The NFC communication means 22 are constituted by an antenna.

These communication means 22 are electrically connected to the user interface and/or to the management and control element 40 of the device 10.

The second portion 13 of the device 10 comprises complementary communication means 23 of the NFC type.

The electric pump 11 comprises mechanical means for the engagement of the second portion 13 of the device 10, which comprises corresponding complementary mechanical means.

In particular, the antenna 22 is arranged proximate to a receptacle 24, which is internal to the electronic section 18 and can be accessed from the outside of the shell 19 but is external to the compartment 20.

The receptacle 24 is adapted for the insertion of the second portion 13 of the device 10, at least at the complementary NFC communication means 23.

The complementary NFC communication means 23 are arranged in one end of the second portion 13.

By means of the NFC communication between the antenna 22 of the control and actuation unit 21 and the complementary communication means 23 of the device 10 it is possible to install the device 10 without the need to physically/electrically connect its second portion 13 to the management and control element 40 and/or to the user interface.

This allows at the same time to reduce the risk of infiltrations within the compartment 20.

Furthermore, the user can purchase the electric pump 11 and decide later if and when to purchase and install the device 10.

By virtue of the NFC communication between the antenna 22 of the control and actuation assembly 21 and the complementary communication means 23 of the second portion 13, the user can install autonomously and easily the device 10 on the electric pump 11.

In the specific case, the receptacle 24 of the electric pump 11 has such a shape and dimensions that it is substantially shaped complementarily to at least the complementary communication means 23, so as to ensure their easy insertion and coupling of the means inside it.

The second portion 13 of the device 10 has a substantially quadrangular profile and is substantially flat.

The pressure transducer 15 is laterally adjacent and electrically connected to the complementary communication means 23 and converts the pressure into an electrical signal which is then sent to the management and control element 40 and/or to the user interface.

The transducer 15 is an integrated circuit which comprises:
- a piezoresistive element which detects absolute pressure,
- an electronic circuit for the analog conditioning of the signal,
- a digital interface, useful for communication with a microcontroller/microprocessor.

The device 10 comprises a tube 25, made of plastic material, such as silicone, which extends starting from the transducer 15 toward the bottom of the tank.

In particular, the tube 25 runs along one side of the electric pump 11, inside an adapted duct 26, which has a vertical extension.

The duct 26 is provided by means of:
- a first channel 31, which is anchored to one side of the electric pump 11,
- a second covering channel 32, which is fixed to the first channel 31 so as to provide the duct 26.

The tube 25 leads into a substantially bell-shaped element 28, with which it communicates and which is arranged substantially at the wet section 16 of the electric pump 11, outside the shell 19.

The tube 25 contains air, and its particular shape and arrangement, inside the duct 26 and the substantially bell-shaped element 28, and the presence of the substantially bell-shaped element 28 cause the liquid to be unable to rise up to the transducer 15 even when the electric pump 11 is immersed.

In this matter, the tube 25 is prevented from being full of water, altering the reading of the transducer 15.

The electric pump 11 is in fact immersed vertically and during this step air is present inside the substantially bell-shaped element 28 and, due to the shape of said element, is unable to evacuate, remaining trapped inside the assembly constituted by:
- the substantially bell-shaped element 28,
- the tube 25.

A level variation inside the well/tank causes a pressure variation of the air in the tube 25, which in turn causes a certain stress on the transducer 15.

The second portion 13 of the device 10 is contained in the electronic section 18 of the electric pump 11, outside the compartment 20, in a subsection 29.

The transducer 15 is enclosed in the second portion 13, which is co-molded around the transducer 15, portion which isolates and renders it impermeable.

The operation of the device 10 according to the invention is as follows.

The user records the values of the dimensions of the well/tank in the user interface of the electric pump 11.

The air pressure sensor, in the first portion 12 of the device 10, data-linked by means of a PLC to the management and control element 40 of the device 10 and/or the user interface of the electric pump 11, measures the atmospheric pressure.

The pressure transducer 15 simultaneously measures the pressure inside the well/tank.

The management and control element 40 of the device 10 and/or the user interface of the electric pump 11 calculates the difference between these two pressures (ambient and well/tank), returning the value of the level of the well/tank, calculated on the basis of its dimensions entered initially.

In practice it has been found that the invention achieves the intended aim and objects, providing a device for detecting the level of a well/tank that can be installed easily by the user and at any time.

The invention provides a device for detecting the level of a well/tank that is at least partially integrated in the electric pump used in said well/tank and has a small space occupation.

Moreover, the invention provides a device for detecting the level of a well/tank that allows to avoid the need to provide a dedicated access to the well/tank for its power supply and its operation, but utilizes the same access to the well/tank that is used by the electric pump with which it is at least partially integrated.

Finally, the invention provides an electric pump which comprises a device for detecting the level of a well/tank that is capable of achieving the aims and objects listed above.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102019000012879 from which this application claims priority are incorporated herein by reference.

What is claimed is:

1. An electric immersion pump having a vertical extension in a configuration for use and comprising a containment shell inside which there are: a wet section, which comprises an intake portion, a delivery portion, and one or more impellers keyed on a shaft, each of the one or more impellers having its own diffuser and being interposed between said intake portion and said delivery portion, —an electromechanical section, which comprises motor means for driving said shaft, and—an electronic section, comprising a compartment inside which an assembly for the control and actuation of said electric immersion pump is contained, said control and actuation assembly being provided with an electrical board, wherein said control and actuation assembly is connected to a user interface of said electric immersion pump and comprises a wireless Near Field Communication (NFC) means, said electric immersion pump further comprising a device at least partially integrated in said electric immersion pump, said device comprising—a management and control element of the electronic type, —a first portion comprising an air pressure sensor physically or electrically connected to said management and control element, and—a second portion comprising a pressure transducer connected to said management and control element by means of a wireless connection, said NFC means being connected electrically to said user interface or to said a management and control element, said second portion further comprising complementary NFC communication means, wherein said complementary NFC communication means is arranged proximate to a receptacle, said receptacle being internal to said electronic section and being accessible from the outside of said shell, said receptacle being external to said compartment, said transducer being disposed in said receptacle adjacent said complementary NFC communication means.

2. The electric immersion pump according to claim 1, wherein said air pressure sensor has a data link to said management and control element by means of a Power Line Communication (PLC).

3. The electric immersion pump according to claim 1, wherein said transducer is laterally adjacent and electrically connected to said complementary NFC communication means.

4. The electric immersion pump according to claim 1, wherein said device comprises a tube, said tube extending from said transducer, said tube running along a side of said electric immersion pump within an adapted duct, said duct having a vertical extension, said tube leading inside a substantially bell shaped curved element with which it communicates, said substantially bell shaped curved element being arranged adjacent said wet section of said electric immersion pump outside said shell.

5. The electric immersion pump according to claim 1, wherein said second portion of said device is contained in said electronic section of said electric pump outside of said compartment and in a subsection.

6. The electric immersion pump according to claim 1, wherein said management and control element of said device is connected to and/or coincides with said user interface of said electric immersion pump.

* * * * *